(12) United States Patent
Hosokawa

(10) Patent No.: US 7,158,755 B2
(45) Date of Patent: Jan. 2, 2007

(54) PORTABLE DATA TERMINAL

(75) Inventor: Taisuke Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 443 days.

(21) Appl. No.: 10/443,073

(22) Filed: May 22, 2003

(65) Prior Publication Data

US 2003/0220077 A1 Nov. 27, 2003

(30) Foreign Application Priority Data

May 27, 2002 (JP) ............... 2002-152126

(51) Int. Cl.
*H04B 7/00* (2006.01)
(52) U.S. Cl. ............... 455/41.2; 455/575.3; 455/435.1; 455/435.2; 455/412.1; 455/404.2; 455/456.1; 455/566
(58) Field of Classification Search ............... 455/41.2, 455/435.1, 435.2, 566, 557, 412.1, 90.3, 455/575.3
See application file for complete search history.

(56) References Cited

U.S. PATENT DOCUMENTS

| | | | | |
|---|---|---|---|---|
| 5,745,483 A * | 4/1998 | Nakagawa et al. | ......... | 370/335 |
| 6,445,917 B1 * | 9/2002 | Bark et al. | ................... | 455/423 |
| 6,493,550 B1 * | 12/2002 | Raith | ....................... | 455/422.1 |
| 6,697,638 B1 * | 2/2004 | Larsson et al. | .......... | 455/553.1 |
| 6,792,247 B1 * | 9/2004 | Law et al. | ................. | 455/41.2 |
| 6,795,421 B1 * | 9/2004 | Heinonen et al. | ........... | 370/338 |
| 6,907,227 B1 * | 6/2005 | Fujioka | ..................... | 455/41.3 |
| 6,907,257 B1 * | 6/2005 | Mizutani et al. | ............ | 455/464 |
| 6,930,987 B1 * | 8/2005 | Fukuda et al. | .............. | 370/328 |
| 6,957,045 B1 * | 10/2005 | Haller et al. | ................ | 455/41.1 |
| 2003/0032419 A1 | 2/2003 | Shibasaki et al. | | |

FOREIGN PATENT DOCUMENTS

| | | |
|---|---|---|
| EP | 1 303 077 | 4/2003 |
| GB | 2 365 263 | 2/2002 |
| GB | 2 376 850 | 12/2002 |
| GB | 2 388 748 | 11/2003 |
| JP | 2001-128242 | 5/2001 |
| JP | 2001-359143 | 12/2001 |
| JP | 2002-359873 | 12/2002 |
| KR | 2002-0037800 | 5/2002 |
| WO | 02/28030 | 4/2002 |
| WO | WO 03/003610 | 1/2003 |
| WO | WO 03/047135 | 6/2003 |
| WO | 03/054574 | 7/2003 |

* cited by examiner

*Primary Examiner*—Marceau Milord
(74) *Attorney, Agent, or Firm*—Young & Thompson

(57) ABSTRACT

A short distance wireless communication function (140) such as Bluetooth is provided as a communication function part, which is subordinate to a main communication function having a communication function like that of a usual portable telephone set for making communication via a network. Among other units present in the neighborhood, those conforming to preset search conditions are set as limited opposite side units (110, 120, 130) for direct data transmission to these opposite side units (200, 300) with a close distance wireless communication function (140).

12 Claims, 4 Drawing Sheets

PORTABLE DATA TERMINAL

BACKGROUND OF THE INVENTION

This application claims benefit of Japanese Patent Application No. 2002-152126 filed on May 27, 2002, the contents of which are incorporated by the reference.

The present invention relates to improvements in portable data terminal unit capable of direct communication with other terminal units without network, which is different from the usual portable telephone set having a main communication function part including a communication function via a network.

Up to date, a file transfer system has been proposed, which permits direct file transfer between portable data terminals without agency of any file server and also permits file transfer request operation input on the sole telephone set side (Japanese Patent Laid-Open No. 2001-128242). This proposal concerns a system for transmitting (i.e., down-loading) files in remote places to a near-by portable data terminal or personal computer by using a portable telephone set. More specifically, a portable telephone set having a wireless function for portable telephone communication and a separate close distance wireless communication function, is utilized for the transmission (i.e., down-loading) of files.

In the inter-portable telephone terminal file transmission system, each portable telephone terminal internally includes a portable telephone file reception application means for making list request and transmitting selected input, and also a transmission side portable data terminal is provided, which is started by a reception side request to transmit list and subject file. The system is thought to provide such effects that it is possible to make direct inter-portable data terminal file transfer without file server which is capable of being commonly used and also improve the operability in that request operations are made from the telephone terminal side alone.

A wireless communication system is also proposed, which comprises a wireless communication means for directly transmitting own position data of GPS (global positioning system) representing the present position of a wireless communication unit to a measurement subject unit by wireless communication based on Bluetooth, and a computing means for computing, after reception of a signal of response to the own position data signal returned from the measurement subject unit, the distance of the measurement subject unit from the present position on the basis of the response signal and own position data signal (Japanese Patent Laid-Open 2001-359143). This system is thought to be able to readily detect the distance and position relation of the measurement subject by directly exchanging measurement signal and response signal as subject of measurement without agency of any base station.

The Bluetooth represents close distance wireless data communication standards which are provided by Bluetooth SIG (Special Interest Group) as a standardizing group. The standards use a spread spectrum communication system based on frequency hopping system, in which 79 channels of a bandwidth of 1 MHz are set in an ISM Band (Industrial Scientific and Medical Equipment Band) of a bandwidth of 2.4 GHz for switching at a rate of 1,600 times a second. The system permits the data communication at a close distance of about 10 m with a data transmission rate of about 1 Mbit/s(actually 721 Kbits/s).

In the system proposed in Japanese Patent Laid-Open No. 2001-128242, it is necessary to provide, in each portable telephone terminal, the portable telephone file reception application means for making list request and transmitting the selected input and also provide a transmission side portable data terminal for transmitting list and subject file, leading to complicated construction.

The proposal in the Japanese Patent Laid-Open No. 2001-128242, on the other hand, can not permit direct transmission of voice and data between two portable telephone terminals by using the Bluetooth.

Furthermore, as is well known in the art, when making search of other terminals by using the Bluetooth, all terminals able to make communication are recognized, and it is thus difficult to limit the opposite side of communication to only terminals as desired by the user without provision of any particular means. Also, when it is desired to transmit data to sole wireless data terminal present in the neighborhood by using such close distance wireless communication function as the Bluetooth and infrared communication, a cumbersome operation of matching on both the transmitting and receiving sides is necessary.

Particularly, in the case when transmission data represents images picked up by an imaging device, there has been no effective means of satisfying, in a simple operation, needs for transmitting the data to a plurality of particular terminals present in the neighborhood.

SUMMARY OF THE INVENTION

An object of the in invention is to provide a portable data terminal unit, which utilizes the Bluetooth or like close distance wireless communication function for wireless communication with other units without agency of any network but directly.

Another object of the present invention is to provide a unit of this type capable of providing particular convenience with respect to transmission of images picked up by an imaging device.

According to an aspect of the present invention, there is provided a portable data terminal unit provided with a short distance communication function part for short distance wireless communication with other units suited for communication with the own unit, wherein the short distance wireless communication function part has a search function part for searching other units as opposite side communication units conforming to preset conditions.

The search function part includes a search condition memory part for storing a plurality of search conditions registered in such a form as to be selectable as desired by the user. The search function part has a display function part for displaying a result of the search. The search function part includes a search condition memory part for storing a plurality of search conditions registered in such a form as to be selectable as desired by the user, a display function part for displaying other units, which are found, as a result of search conducted under the search conditions registered in the search condition memory part, to be in conformity to the search conditions, and a selection operating part for selecting desired one of a plurality of other units displayed, as a result of search, on the display function part. The selection operating part is constructed to be capable of selecting a plurality of pertinent other units at a time. The portable data terminal further comprises an imaging part for obtaining electronic image data corresponding to a light image of a scene object. The portable data terminal unit further comprises an image transmitting means for transmitting newest data among electronic image data obtained in the imaging part by the short distance wireless communication function part to other units as opposite side units of communication conforming to the preset conditions. The portable data terminal unit further comprises a control part capable, in case when an operation of starting an operation of obtaining electronic image data by the imaging part is made, of also automatically starting a function of searching other units as opposite side units of communication conforming to the preset conditions so long the image transmitting functions has been selected. The short distance wireless communication function part is provided as a communication function part subordinate to a main communication function part having a communication function for communication via a network.

Other objects and features will be clarified from the following description with reference to attached drawings.

PREFERRED EMBODIMENTS OF THE INVENTION

Preferred embodiments of the present invention will now be described with reference to the drawings.

Figure 1:
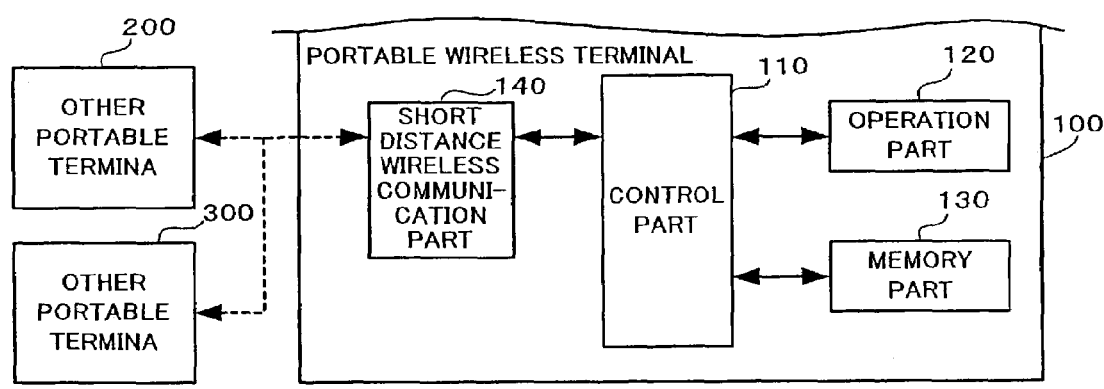
FIG. 1 is a block diagram showing an essential part of an embodiment of the present invention.

FIG. 1 is a block diagram showing an essential part of an embodiment of the present invention. Referring to FIG. 1, a portable wireless terminal 100 as the embodiment of the portable data terminal unit, comprises a control part 110 for collectively controlling the entire system of the terminal unit, an operation part 120 including such components as operation keys for accepting various operations by the user under control of the control part 110, a memory unit 130 for holding data used for various computation controls in the control part 110, and a short distance wireless communication part 140 for performing short distance wireless communication in a specific region corresponding to specifications with other portable terminals 200 and 300 having the same construction as the portable terminal 100.

The operation part 120 accepts an operation for starting a search function to be described later. Personal (individual) data or the like to be referred to at the time of the search are preliminarily stored in the memory part 130. The short distance wireless communication part 140 is constructed to be used for search and data communication for other terminals present in the neighborhood, i.e., a narrow region, which is defined to allow wireless communication therein based on specifications. The data communication is performed as wireless communication with other portable wireless terminals 200 and 300 without any network but directly. Although not described in details with reference to drawing, in the instant portable wireless terminal 100, the above short distance wireless communication part 140 as described before with reference to FIG. 1 is provided as communication function part subordinate to a main communication function part having a function of allowing communication via a network. The main communication function part has a construction based on a CDMA (Code Division Multiple Access) system like a well-known communication function part. The short distance wireless communication part 140, on the other hand, is based on the Bluetooth or infrared communication system.

Figure 2:
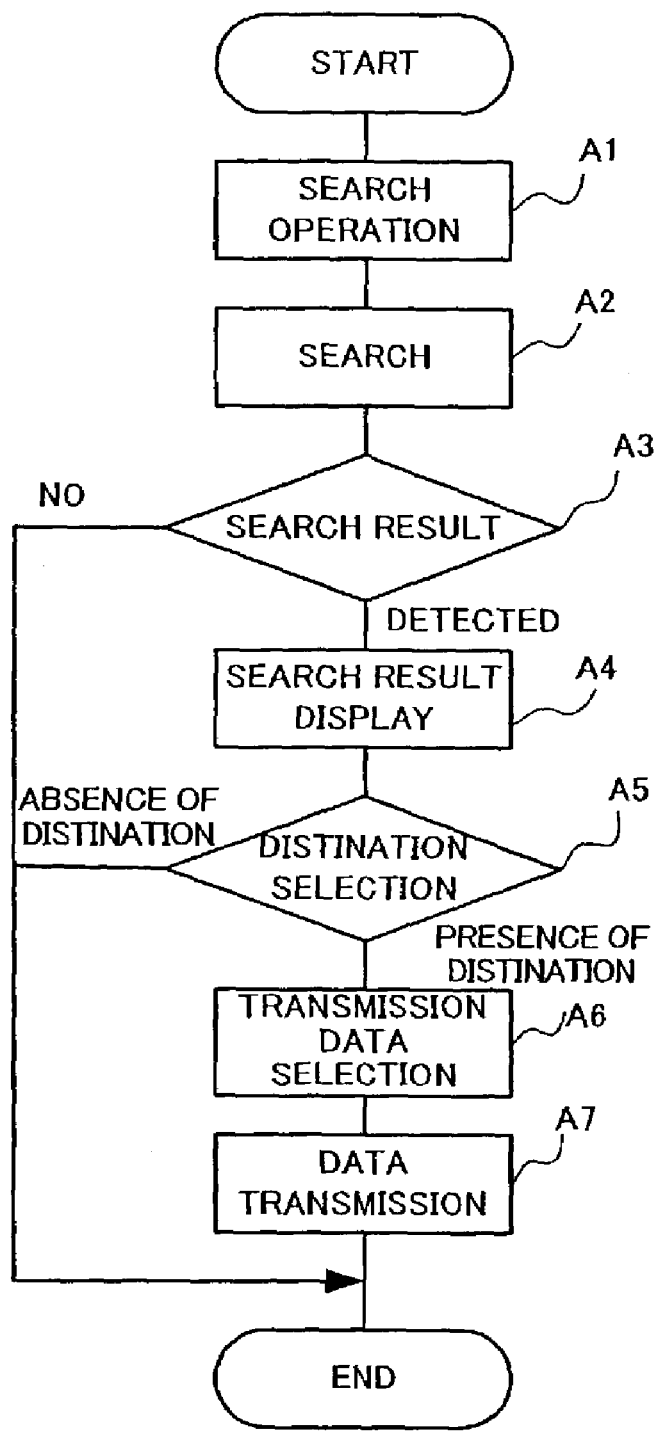
FIG. 2 is a flow chart representing the overall operation of the FIG. 1 embodiment.

FIG. 2 is a flow chart representing the overall operation of the FIG. 1 embodiment. The operation of the embodiment will be described in details with reference to this flow chart.

A search function is provided by an operation in the operating part 120 under control of the control part 110 (Steps A1 and A2). The search function is realized by performing direct communication with the other wireless communication terminal 200 and 300 without agency of any network by using the short distance wireless communication part 140. Conditions for detection can be set when performing the search, and data for setting the conditions correspond to the personal data stored in the memory part 130 and such data as IDs of the opposite side terminals 200 and 300. These data are selectively used as desired as pertinent search conditions.

For example, a search condition that "registration has been made in the own terminal telephone set" is set. When no portable data terminal meeting the condition is detected as a result of the search, the process is ended (Step A3). When a pertinent portable data terminal is detected (Step A3), the search result is displayed on the screen (Step A4).

According to the search result, "DESTINATION" of data is selected (presence of destination), or "NON-TRANSMISSION" (absence of destination) is selected (Step A5).

Then, transmission data is selected (Step A6), and it is transmitted to limited other sets (i.e., portable data terminal units) conforming to the search conditions as the destination (Step A7).

In this embodiment, the opposite side of communication can be limited to only terminals that are desired by the user as desired above. The data transmission is thus made possible by selecting only the opposite side sets conforming to the aim of communication by a simple operation.

As shown above, with the embodiment according to the present invention as described with reference to FIGS. 1 and 2, it is possible to preclude the cumbersomeness of dealing with the prior art set that it is necessary for data transmission, even with respect to super-short distance opposite side sets of communication, to attach image data to the mail and designate the designation for transmitting data via the network. In addition, such cumbersomeness as it is necessary to set common ciphers can be precluded while utilizing short distance communication such as infrared communication, and it is necessary to transmit data or the like to near destination terminals in a simple operation.

Figure 3:
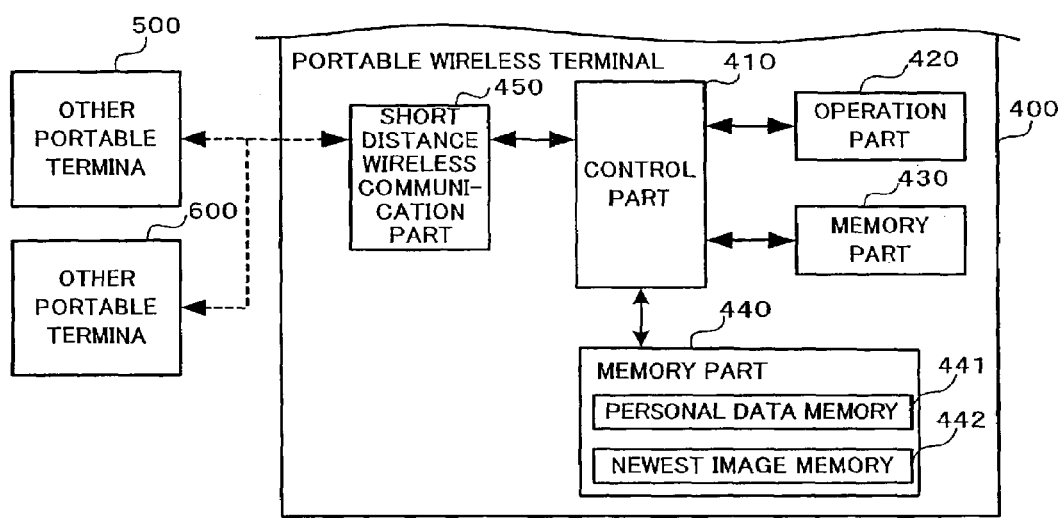
FIG. 3 is a block diagram showing an essential part of a different embodiment of the present invention.

FIG. 3 is a block diagram showing an essential part of a different embodiment of the present invention. This embodiment has an imaging function as well. When it is desired to transmit an image picked up on the site by using an imaging function to a portable wireless terminal present in the neighborhood, the image data should heretofore been transmitted by attaching it to mail and designating the destination. Also, even in the case of short distance communication such as infrared communication, the operation is such cumbersome that it is necessary to set common ciphers. In this embodiment, it is possible to simplify the operation of selecting the destination of image transmission and transmit a picked-up image to neighbor terminals in a simple operation. This embodiment will now be described.

Referring to FIG. 3, this embodiment of the portable wireless terminal 400 has a construction including a microprocessor, and it comprises a control part 410 for collectively controlling the entire system of the terminal unit, an operating part 420 including such components as operating keys for accepting various operations by the user under control of the control part 410, an imaging part 430 for obtaining electronic image data corresponding to a light image of a scene object, a memory part 440 for storing the data used for various computation controls in the control part 410, and a short distance wireless communication part 450 for performing short distance wireless communication with other portable terminals 500 and 600 having the same construction as the portable terminal 400 in a limited region corresponding to specifications.

The operating part 420 accepts operations for accepting an imaging function and a search function like those in the previous embodiment described before. In this embodiment, the imaging function and the search function are adopted be started in response to a single operation of the operating part 420. When an imaging operation of depressing a trigger switch (not shown) for imaging is performed, the search operation is also automatically started so long as a transmitting function has been selected.

The memory part 440 includes N personal data memory part 441 and a newest image memory part 442. Personal data which is referred to at the time of the search is preliminarily stored in the personal data memory part 441. The newest one of picked-up images is stored in the newest image memory part 442. The short distance wireless communication part 450 is adopted to suit the search and data transmission for other terminals present in the neighborhood, i.e., a relatively narrow limited region, in which direct wireless communication is allowed according to the specifications, and it performs wireless data communication with the other portable wireless terminals 500 and 600 without any network. Again in this embodiment, the above short distance wireless communication part 450 described before with reference to FIG. 3, is provided as a communication function part subordinate to the main communication function part which, although not shown with reference to the drawings, has a function of communication via a network. Again in this embodiment, the main communication function part has the similar CDMA system structure to the portable telephone set described above. The short distance wireless communication part 450, on the other hand, is of such system as the Bluetooth and infrared communication.

Figure 4:
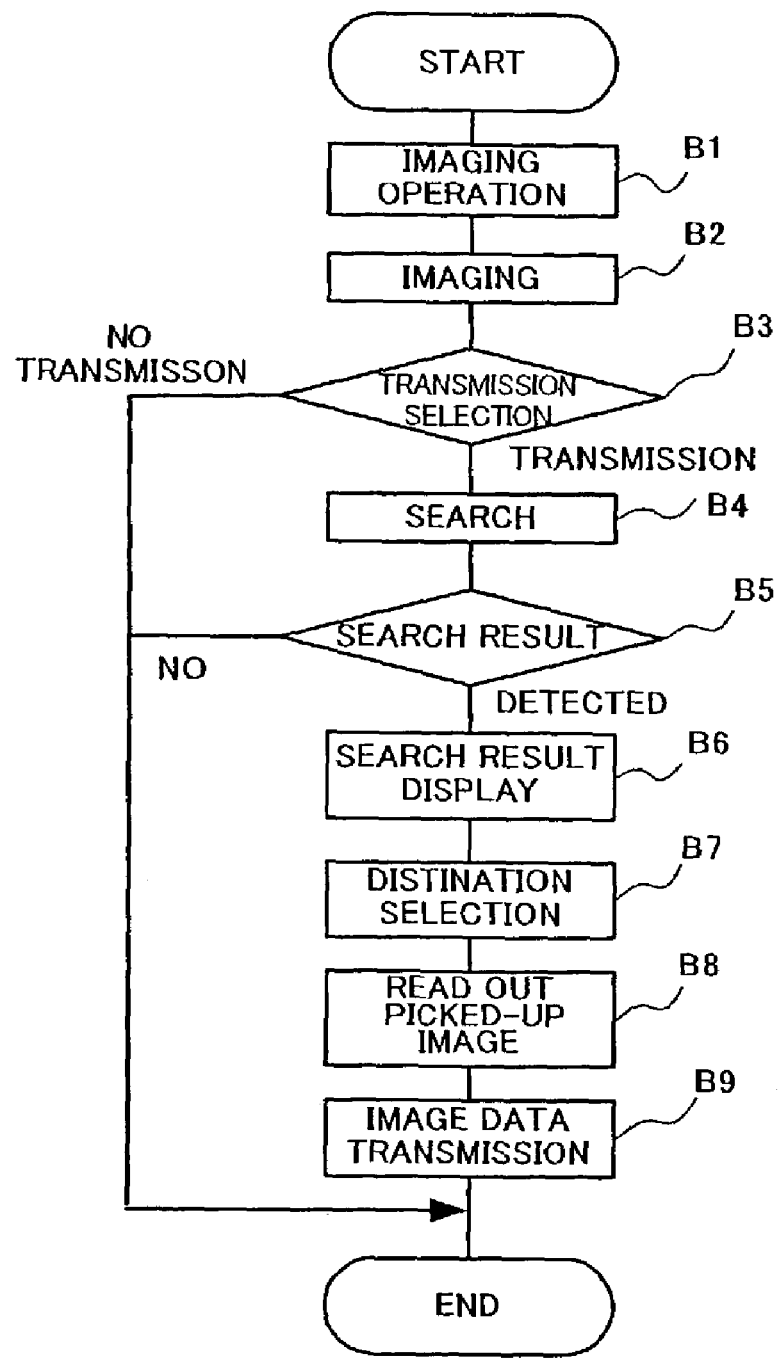
FIG. 4 is a flow chart illustrating the operation of the whole embodiment shown in FIG. 3.

FIG. 4 is a flow chart illustrating the operation of the whole embodiment shown in FIG. 3. The operation of the embodiment will now be described in detail with reference to this flow chart.

First, the operating part 120 operates the imaging unit 430 under control of the control part 410 (Steps B1 and B2).

Data of images picked up by the imaging unit 430 are stored in the newest image memory part 442 in the memory part 440.

Then, a decision as to whether the picked-up images are to be transmitted (selecting operation) is made (Step B3). When "TRANSMIT" is selected, a search function is automatically started under control of the control part 410 (Step B4).

The search function is realized by using the short distance wireless communication part 450 for direct communication with the other portable wireless terminals 500 and 600 without any network. It is possible to set search conditions when performing the search. As for data for setting the conditions, reference is made to the personal data stored in the personal data memory part 141 of the memory part 140 and such data as IDs of the opposite side terminals 500 and 600. For instance, a search condition that "registration has been made in the telephone diary of the own terminal" is set.

When no terminal satisfying the conditions has been detected as a result of the search, the process is ended (Step B5). When a pertinent terminal has been detected (Step B5), the result of the search is displayed on the screen (Step B6). Selection of image destinations is performed from the search result (Step B7).

After confirming that the imaging has been ended and that the picked-up images are stored in the newest image part of the memory part, the images are read out (Step B8), and transmitted to the terminals selected in Step B7 by using the short distance wireless communication part 450 (Step B9).

In this embodiment, it is possible to transmit data to particular terminals in the neighborhood in a simple operation. Particularly, in case when the transmission data is electronic image data obtained by the imaging device, despite the fact that there are needs for transmitting on the site the data to a plurality of particular terminals present in the neighborhood, heretofore there has been no effective means for meeting such needs in a simple operation without agency of any network. The embodiment of the present invention can secure the convenience that it is possible, even in the above image data transmission case, to limit destinations present in the neighborhood region and performs such image transmission in a very simple operation.

As has been described in the foregoing, according to the present invention it is possible to adopt such close distance wireless communication function as Bluetooth for performing direct wireless communication by limiting the destinations with a simple construction and in a simple operation without agency of any network. It is also possible to secure the convenience that, regarding the transmission of image data obtained with an imaging device, to transmit such images in a very simple operation by adopting the close distance wireless communication function and limiting the destinations.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A portable data terminal unit provided with a short distance communication function part for short distance wireless communication with other units suited for communication with the own unit, wherein the short distance wireless communication function part has a search function part for searching other units as opposite side communication units conforming to preset conditions, wherein the search function part includes a search condition memory part for storing a plurality of search conditions registered in such a form as to be selectable as desired by the user, a display function part for displaying other units, which are found, as a result of search conducted under the search conditions registered in the search condition memory part, to be in conformity to the search conditions, and a selection operating part for selecting desired one of a plurality of other units displayed, as a result of search, on the display function part.

2. The portable data terminal unit according to claim 1, wherein the selection operating part is constructed to be capable of selecting a plurality of pertinent other units at a time.

3. The portable data terminal unit according to claim 1, which further comprises an imaging part for obtaining electronic image data corresponding to a light image of a scene object.

4. The portable data terminal unit according to claim 1, wherein the short distance wireless communication function part is provided as a communication function part subordinate to a main communication function part having a communication function for communication via a network.

5. The portable data terminal unit according to claim 1, wherein the preset conditions define a particular opposite side communication unit.

6. The portable data terminal unit according to claim 5, wherein the preset conditions include an identification of the particular opposite side communication unit.

7. A portable data terminal unit comprising:
   a short distance communication function part for short distance wireless communication with other units suited for communication with the own unit, wherein the short distance wireless communication function part has a search function part for searching other units as opposite side communication units conforming to preset conditions;
   an imaging part for obtaining electronic image data corresponding to a light image of a scene object; and
   an image transmitting means for transmitting newest data among electronic image data obtained in the imaging part by the short distance wireless communication function part to other units as opposite side units of communication conforming to the preset conditions.

8. The portable data terminal unit according to claim 7, wherein the search function part includes a search condition memory part for storing a plurality of search conditions registered in such a form as to be selectable as desired by the user.

9. The portable data terminal unit according to claim 7, wherein the search function part has a display function part for displaying a result of the search.

10. A portable data terminal unit comprising:
    a short distance communication function part for short distance wireless communication with other units suited for communication with the own unit, wherein the short distance wireless communication function part has a search function part for searching other units as opposite side communication units conforming to preset conditions;
    an imaging part for obtaining electronic image data corresponding to a light image of a scene object; and
    a control part capable, in case when an operation of starting an operation of obtaining electronic image data by the imaging part is made, of also automatically starting a function of searching other units as opposite side units of communication conforming to the preset conditions so long the image transmitting functions has been selected.

11. A portable data terminal unit comprising:
    a first communication device for communicating with other units through a network;
    a second communication device for short distance direct wireless communication with other terminal units suited for communication therewith;
    a memory storing a preset search condition that defines a particular terminal unit with which communication is to be conducted by said second communication device; and
    a searching device that retrieves the preset search condition from said memory and searches for the particular terminal unit that meets the preset search condition,
    said second communication device communicating with the particular terminal unit meeting the preset search condition when the particular terminal unit has been located by said searching device.

12. The portable data terminal unit according to claim 11, wherein the preset search condition is an identification of the particular terminal unit.

* * * * *